United States Patent
Kilgour et al.

[15] 3,690,048
[45] Sept. 12, 1972

[54] AGRICULTURAL MACHINE
[72] Inventors: John Kilgour, Orchard House, 14 High St., Gravenhurst; Peter Charles John Payne, 34 High St., Clophill; John Stewart Reid, 4 Trinity Rd., Billericay; Eric George Everett, "Billeigh" South Hanningford Rd., Rettendon, Chelmsford, all of England

[22] Filed: May 14, 1971
[21] Appl. No.: 143,413

[30] Foreign Application Priority Data
May 21, 1970   Great Britain..........24,538/70

[52] U.S. Cl. ...............................................56/13.5
[51] Int. Cl. .......................A01d 41/08, A01d 45/30
[58] Field of Search.......................56/126–130, 113, 56/114, 116, 13.5

[56]        References Cited
UNITED STATES PATENTS 2,495,417   1/1950   McConnel et al. ...........56/129
2,658,321   11/1953   Armstrong....................56/126
3,184,905   5/1965   Hillier...........................56/130

FOREIGN PATENTS OR APPLICATIONS
655,330   7/1951   Great Britain................56/129

Primary Examiner—Russell R. Kinsey
Attorney—Hofgren, Wegner, Allen, Stemman & McCord

[57]          ABSTRACT

A harvesting machine has a base frame and a sub-frame. The sub-frame is moved up and down relative to the base frame by a parallel linkage arranged so that a grain gathering rotor on the sub-frame is moved forwards as it moves upwards. The operator's seat is on the sub-frame adjacent the rotor.

8 Claims, 9 Drawing Figures

PATENTED SEP 12 1972

INVENTORS
JOHN KILGOUR,
PETER CHARLES JOHN PAYNE
BY JOHN STEWART REID, &
ERIC GEORGE EVERETT
Hofgren, Wegner, Allen, Stellman & McCord
ATTORNEYS

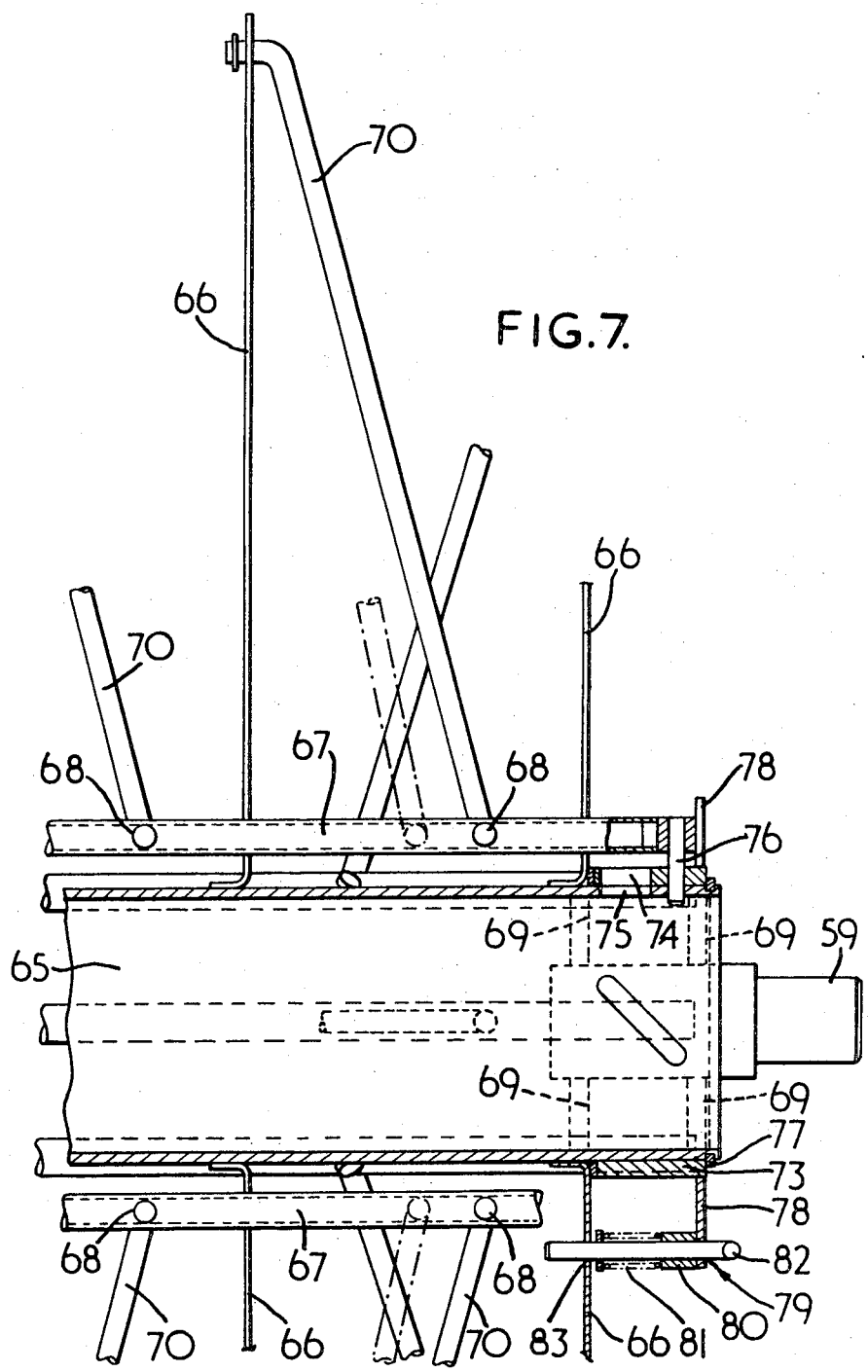

AGRICULTURAL MACHINE

This invention relates to an agricultural machine and particularly to a harvesting machine for harvesting grain.

The invention has particular, but not exclusive, application to harvesting machines for harvesting rice, oats or other grain which grows as panicles.

The harvesting machine of the invention is of the kind which harvests the grain by the use of a rotor, the height of which is adjustable up and down to cater for crops of different heights.

Several arrangements have been proposed for adjusting the height of the rotor but these have suffered from various disadvantages. In the arrangement disclosed in British Pat. No. 655,330 the grain gathering arrangement is movable up and down using a parallel link mechanism but in moving upwardly the grain gathering arrangement also moves rearwardly.

An object of this invention is to obviate this and other disadvantages and accordingly the invention provides a harvesting machine comprising a mobile main frame, a subframe mounted on the main frame for movement with respect to the main frame, a parallel linkage connecting the main frame and the sub-frame, actuating means for moving the sub-frame up and down relative to the main frame, and a rotor carried on the sub-frame for gathering grain, the parallel linkage and the actuating means being arranged to move the sub-frame so that the rotor is moved forwards as it is moved upwards and rearwards as it is moved downwards.

Preferably a position for an operator is located on the sub-frame adjacent the rotor so that the operator is in constant relationship to the rotor as the sub-frame is moved with respect to the main frame. In this way, no matter at what height the rotor is operating, the operator always has a clear view of the rotor so that he may control the height of the rotor according to the height of the crop.

The sub-frame may carry a separator for separating grain and waste material, and the sub-frame may maintain a constant attitude to the ground surface during up and down movement relative to the main frame. By maintaining the separator at a constant attitude the separator can be designed to operate most efficiently at a certain attitude and be maintained at that attitude no matter at which height the rotor is operated.

Conveniently the parallel linkage includes links each connected at one end to the main frame and at the other end to the sub-frame, the connections to the main frame being in advance of the connections to the sub-frame with respect to the direction of travel.

The actuating means may include a hydraulic ram connected between the base frame and the sub-frame, and this enables the height of the rotor to be adjusted readily and without discontinuing operation of the machine.

The main frame may be mounted on endless driven tracks for movement over the ground.

The rotor may include beater members for acting on the grain-carrying heads of the crop to remove grain therefrom, the rotor being positioned by the actuating means in use at or below the level of the lowermost heads of the crop.

Conveniently a conveyor is provided for conveying grain to collecting means located on the main frame, the conveyor being connected at one end to the sub-frame and being pivotable about the other end when the sub-frame is moved relative to the main frame.

Further features of the invention appear from the following description given by way of example only and with reference to the drawings, in which:

FIG. 7 is an enlarged sectional view of a portion of a threshing head rotor;

Figure 1:
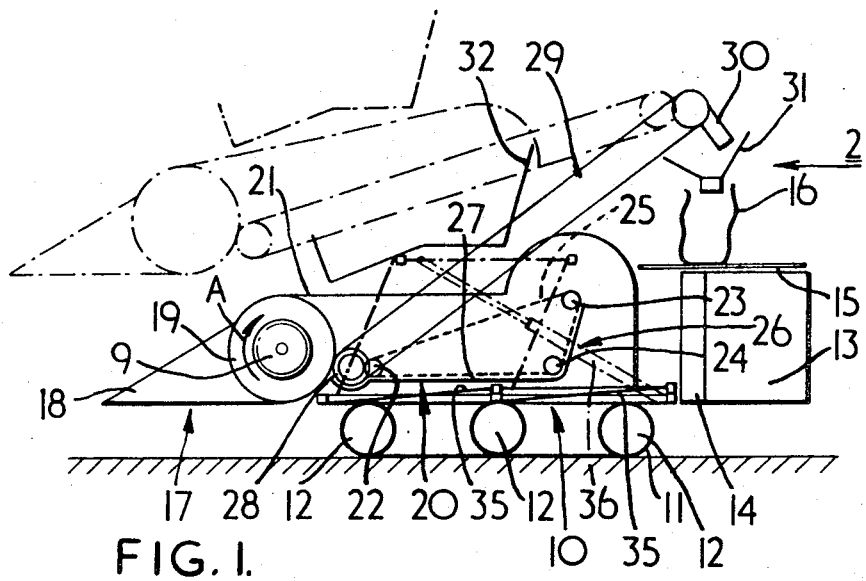
FIG. 1 is a schematic side elevation of a threshing machine.
Figure 2:
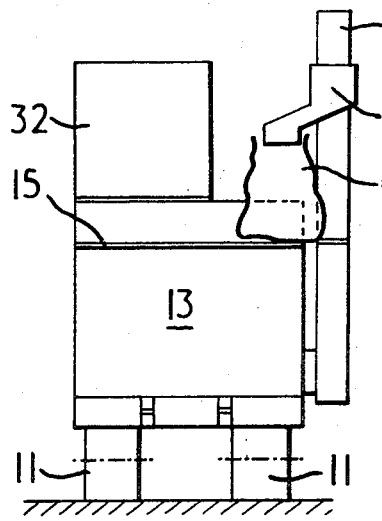
FIG. 2 is a schematic end elevation in the direction of arrow 2 in FIG. 1.

Referring to the drawings and firstly to FIGS. 1 and 2, a machine for harvesting and threshing rice, oats or like grain crops includes a mobile frame 10 mounted on endless tracks 11 extending along each side of the frame and having drive sprockets 12. The tracks 11 may be of known form having resilient pads on the track links for use on road surfaces. The provision of tracks enables the machine to be readily employed on soft surfaces such as may be found in rice-growing fields.

The machine frame 10 carries an engine 13 for driving a pump (not shown) which provides pressure fluid for operating a drive for the tracks 11 and the other power-operated equipment of the machine. A tank 14 for hydraulic fluid is located adjacent the engine 13, and above the engine 13 and tank 14 is a platform 15 for carrying sacks 16 or a grain tank.

A threshing head 17, to be more fully described later, is located at the front of the machine and the head includes tapered dividing arms or presenting members 18 spaced apart transversely of the machine and defining slots in which the crop is collected as the machine moves forward for presentation to a rotor 19 to the rear of the arms 1. The rotor 19 is driven by a hydraulic motor 9 and rotates in a clockwise direction, as shown by arrow A in FIG. 1, so that the leading side of the rotor moves upwardly.

The rotor 19 strikes the heads of the crop thereby releasing the grain and some of the other parts of the head from the remainder of the plants, throwing the mixture of grain and waste rearwardly towards a separator 20. In rotating, the rotor 19 generates a stream of air in which the grain and waste is entrained. A sheet metal cover 21 extends rearwardly from the rotor and serves to constrain the stream of air and the entrained grain and waste mixture to pass into the separator 20.

The separator 20, which will be described more fully with reference to FIG. 3, includes a drive roller 22 and two guide rollers 23 and 24, and an endless movable screen 25 (see FIG. 3) passes round the rollers 22, 23 and 24 to provide a separator screen enclosing a triangular-shaped space.

An angle plate 26 lies parallel and closely adjacent the screen along the horizontal and rear sides of the triangle and serves to constrain the flow of air in the separator to pass out of the separator through an outlet portion of the screen for air and waste. The horizontal portion 27 of the plate 26 also serves as a supporting surface for screened grain which is conveyed by the screen 25 towards an auger conveyor 28 extending transversely towards one side of the machine.

The auger conveyor 28 feeds the screened grain from the separator to an elevator conveyor 29 extending upwardly and rearwardly of the machine. The conveyor 29 may be of any convenient form capable of elevating grain without causing undue degradation, for example an auger conveyor. The conveyor 29 has a chute 30 at its upper end which delivers the grain into a hopper 31, through the base of which the grain is discharged into the sacks 16.

A seat 32 provides an operator's station located on top of the cover 21 so that the operator has a direct view of the head 17 during operation of the machine.

In order to cater for different crop heights the threshing head 17, the separator 20, and the seat 32 are formed as a sub-frame unit which is movable with respect to the main frame 10. In moving forward the machine tends to bend the crop over so that it is inclined away from the machine and if the head 17 were lifted vertically to operate on the crop it would also tend to move away from the crop heads. For this reason the unit is movable upwardly and forwardly to the position indicated by chain lines in FIG. 1.

The sub-frame unit is mounted on the frame 10 by pivotable parallel links 35 of equal lengths and pivotally attached at one end to the frame 10 and at the other end to the unit. A hydraulically operated ram 36 is arranged between the frame 10 and the unit and when operated causes the unit to pivot about the ends of the links 35 and to move forwardly and upwardly, the parallel link arrangement ensuring that the sub-frame unit always remains parallel to the ground surface. The elevator 29 pivots with the unit about its upper end. Because the seat 32 is mounted on and moves with the unit the operator has a good view of the crop and the heads at all times no matter at what height the heads are.

Figure 3:
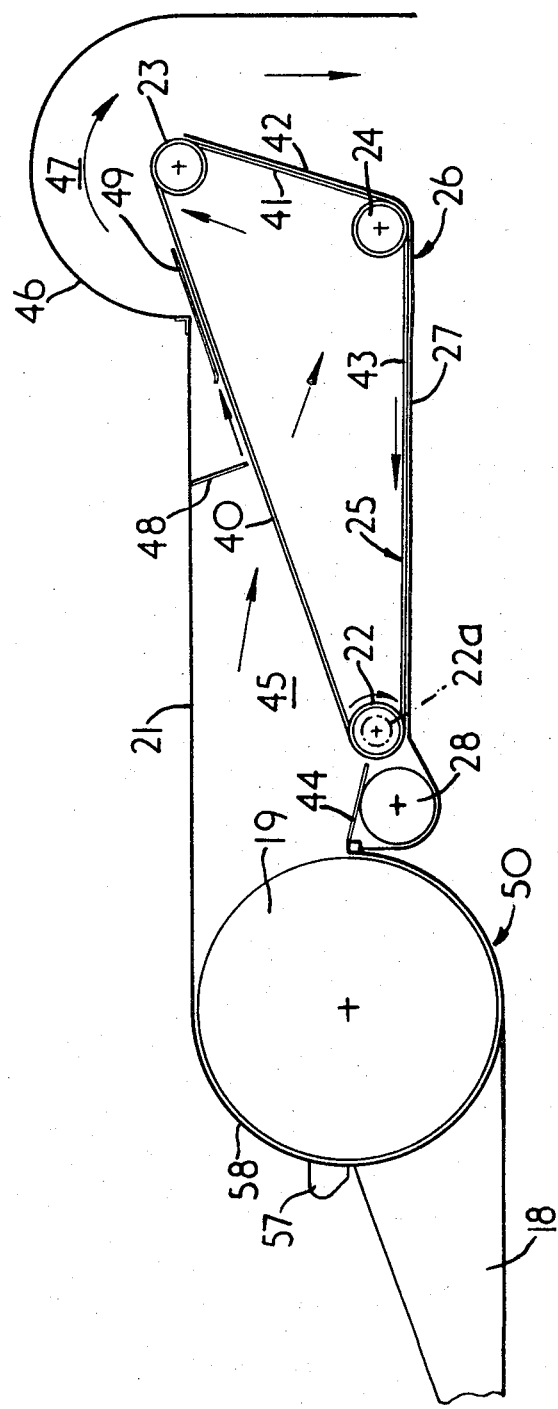
FIG. 3 is a sectional side elevation of a separator.

Referring now to FIG. 3, a separator for separating out grain from waste material is more fully described. The endless movable screen 25 is in the form of a square mesh endless belt having approximately ½ inch square apertures and the belt extends across the full width of the machine. The drive roller 22 is in the form of a slatted roller which is driven by a hydraulically-operated motor 22a to rotate in a clockwise direction as seen in FIG. 2. The guide rollers 23 and 24 are of similar form to the drive roller 22.

The screen 25 encloses a space which is triangular in cross-section and has a screening portion 40 inclined rearwardly and upwardly from the drive roller 22, a rear return portion 41 extending parallel and closely adjacent a portion 42 of the angle plate 26, and a horizontal conveying portion 43 extending closely adjacent and parallel to the horizontal portion 27 of the plate 26. The auger conveyor 28 extends parallel to and adjacent the drive roller 22 and a cover plate 44 prevents access of grain and waste to the auger 28 except after passage through the separator.

The cover 21 which extends rearwardly from the rotor 19 defines a space 45 through which the grain and waste pass to the separator entrained in a stream of air generated by the rotor. The cover 21 extends at its rear end to closely adjacent the upper end of the screening portion 40 and is connected to a part-circular section guide plate 46 which defines an outlet 47 for leading waste from the separator. A depending transverse plate 48 has its lower edge adjacent the screen portion 40 and an adjustable plate 49 lies parallel to and under the and under the rear edge of the cover 21.

The plate 49 is movable in a plane parallel to the screen portion 40, and the part of the screen portion 40 which is located between the lower edge of the plate 48 and the rear edge of the plate 49 is effectively sealed against the flow of air through the screen. The rearmost part of the screen portion 40 behind the rear edge of the plate 49 and adjacent the guide roller 23 constitutes an outlet for the passage of air and waste through the screen. It will be appreciated that the area of said outlet is variable by adjustment of the plate 49.

In operation the separator serves to separate some of the waste material from grain thrown rearwardly from the rotor. Grain and waste pass through the space 45 and some of the waste is caught on the moving screen as the mixture passes through the portion 40. This waste material is carried along the screen, and under the plates 48 and 49. The grain and the remainder of the waste pass into the space within the screen 25 and the grain falls out of the air stream onto the conveying portion 43 of the screen due to the reduction in velocity of the air within the space. The waste material is carried in the air stream through the screen into the outlet 47 at the same time picking up from the screen waste which was initially caught on the screen portion 40. If desired a further supply of air may be admitted into this space enclosed by the screen to improve the discharge of waste material. Such air may be supplied through a transverse pipe extending above the guide roller 24 and having a series of outlet apertures for the air directed upwardly towards the outlet 47.

Screened grain which is now substantially free of waste material is conveyed along the plate 27 by the conveying portion 43 of the screen towards the driving roller 22 and passes between the roller 22 and the plate 27 into the auger conveyor 28 which carries the grain towards the conveyor 29.

Figure 6:
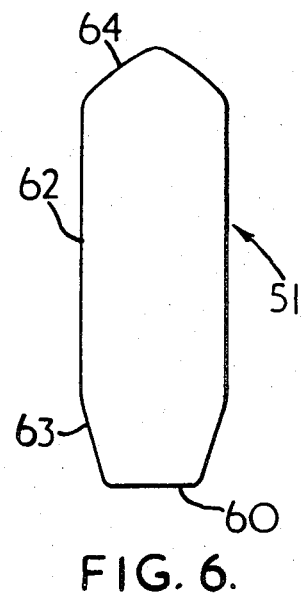
FIG. 6 is a diagrammatic view of one of the dividing members of the head of FIGS. 4 and 5.
Figure 4:
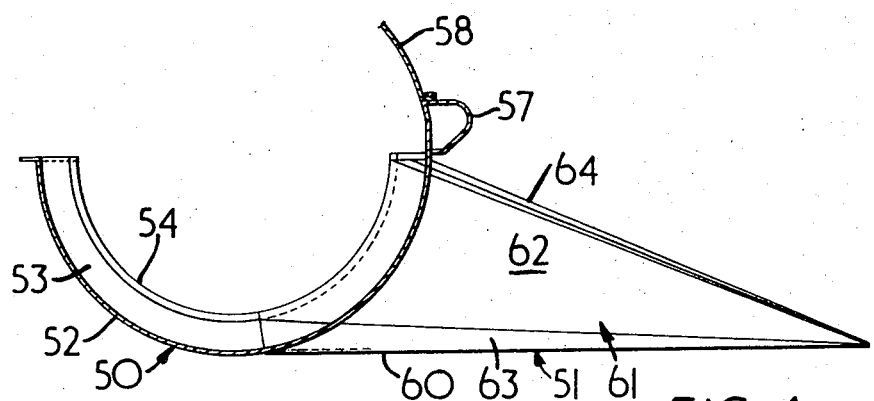
FIG. 4 is a sectional side elevation of a part of a threshing head.
Figure 5:
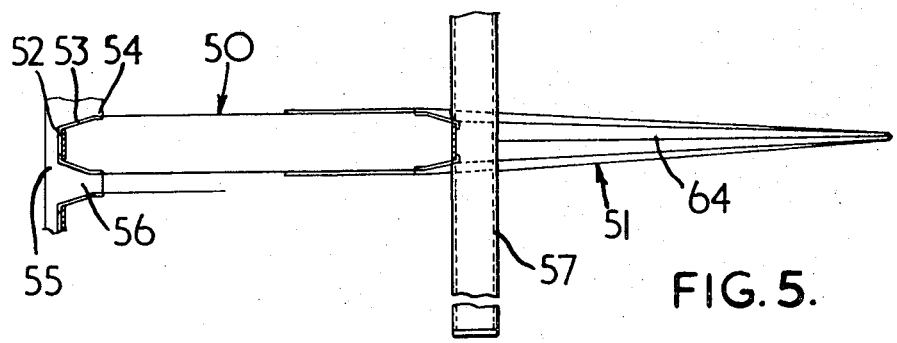
FIG. 5 is a plan view of the part of FIG. 4.

Referring now to FIGS. 4 – 6 the equipment associated with the rotor is shown in more detail. The threshing head includes a plurality of arcuate troughs spaced apart axially of the rotor. In FIGS. 4 and 5 only one of these troughs is illustrated at 50 and each trough 50 is secured to a forwardly extending tapered dividing member 51. Each trough 50 is formed with cylindrical base portion 52 and side walls 53 extending radially inwardly from the base portion 52. The side walls taper outwardly so that the radially inner edges of the side walls 53 are spaced wider apart than the edges of the cylindrical portion 52. The side walls 53 also have radially directed inner edge portions 54. The troughs 50 are of semi-circular form having their upper ends lying in a common horizontal plane.

The rear ends of the trough 50 are interconnected by a transverse plate 55 which has integral projections 56 extending part way between the troughs 50. The troughs are also interconnected by a transverse hollow member 57 which projects beyond the leading edges of the troughs and has a rounded profile. An arcuate plate 58 is attached to the member 57 and is integral with the plate 21 (see FIG. 3).

The dividing members 51 are each constructed of metal plate to form a hollow member which is tapered to provide a pointed leading end. The lower side 60 of each member 51 is wedge-shaped, horizontal and extends tangentially of the base of the associated trough 50. Sides 61 of the member 51 diverge upwardly and rearwardly and merge with the side walls 53 and edge portions 54 of the trough over the forward quadrant of the trough. The sides 61 have vertical wedge-shaped portions 62 and lower vertically-inclined wedge-shaped portions 63. The upper side 64 of each dividing member 51 extends upwardly and rearwardly from the leading point and is welded to the upper leading end of the trough 50. The side 64 is of inverted diverging channel section and the outer surface of the joint between the dividing member and the trough is smoothly contoured. FIG. 6 shows a typical transverse section through a dividing member 51.

It will be appreciated that the gap between adjacent dividing members progressively decreases in the rearward direction to give a minimum gap equal to the gap between adjacent troughs 50. Thus when the threshing head moves forward through the crop the crop heads are gathered together between the dividing members until the heads are presented to the rotor between the troughs. The height of the threshing head is adjusted so that most of the crop heads are below the upper edges of the troughs and above the lowermost edge of the side walls 53 of the trough 50. The heads of any oversize crop contact the transverse hollow member 57 and then pass into the gap between the troughs. As the crop passes between the troughs the rotor beats the heads thereby releasing the grain and the remainder of the heads and the stalks then passes from between the troughs and is left standing in the field.

The projections 56 on the plates 55 serve to reduce the amount of grain freed from the crop by the rotor which can fall onto the ground beneath the rotor. The projections 56 may extend a short way down between the troughs. The presence of the crop over the rest of the gap between the troughs 50 prevents grain falling down between the troughs.

The troughs and the dividing members are constructed to avoid any sharp edges where the heads or the grain are present to thereby reduce damage of the grain and premature release of the grain from the crop.

Figure 9:
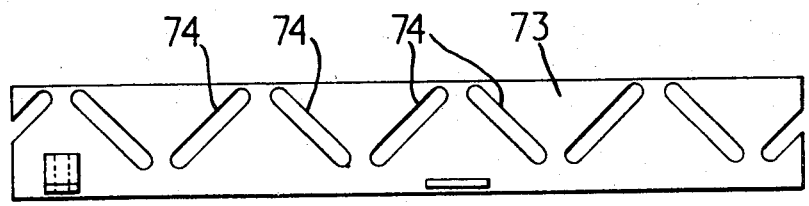
FIG. 9 is a laid flat plan view of a part of the rotor of FIGS. 7 and 8.
Figure 8:
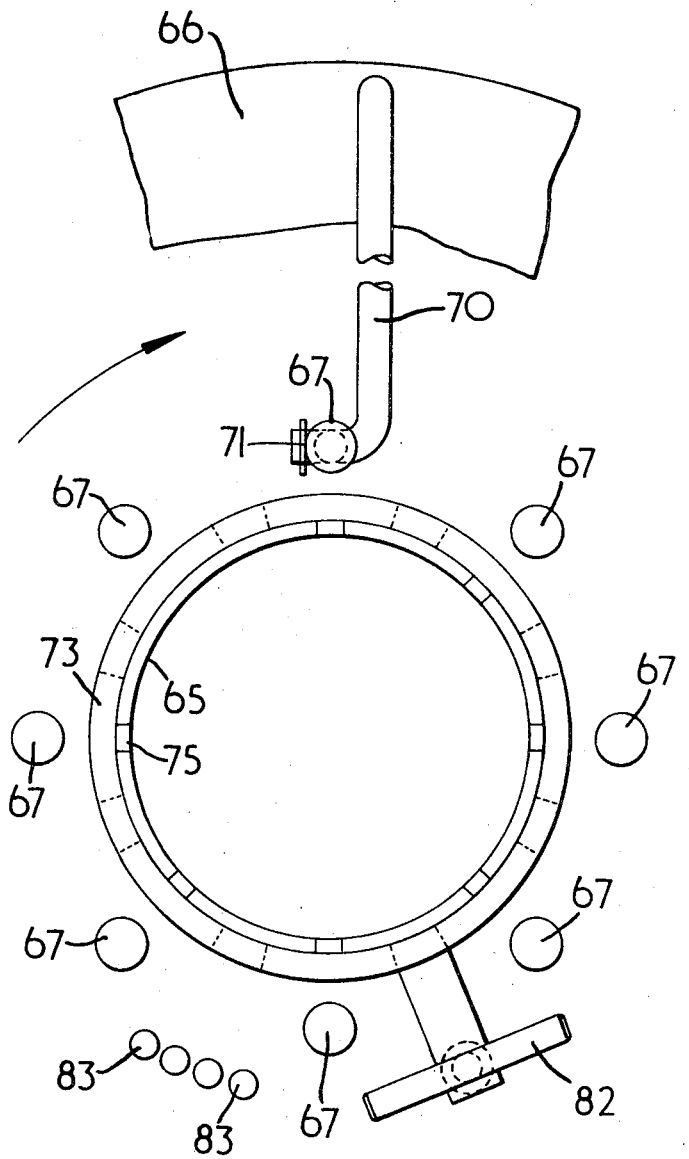
FIG. 8 is an enlarged end elevation of the rotor of FIG. 7.

Referring now to FIGS. 7, 8 and 9, one form of rotor construction is illustrated. The rotor comprises a central tubular shaft 65 around the outer periphery of which are welded axially spaced radial discs 66 (only part of which are shown) disposed in planes at right angles to the shaft 65. The discs are spaced such that each disc 66 extends into one of the troughs 50. Extending through the discs 66 from one end of the shaft 65 to the other are circumferentially equally spaced tubular rods 67 which are longitudinally movable, each rod having a transverse bore 68 located between each pair of adjacent discs 66 and equally spaced along the rod.

At one end the shaft 65 is engaged by drive means 9 (FIG. 1) including a hydraulic motor by which the rotor is rotated. At the opposite end the shaft is formed with a stub shaft 59 secured coaxially of the hollow shaft 65 by annular discs 69 welded to the hollow interior of the shaft 65.

Beater rods 70 of circular cross-section have either straight or curved bent over radially inner ends which fit in the bores 68 in the rods 67 and are held in place by pins 71. The radially outer ends of the rods 70 are bent over to fit into transverse holes located towards the outer edges of the discs 66 but to allow pivoting of the rods 70 relative to the discs. The rods 70 are thus inclined at an acute angle to planes at right angles to the axis of the shaft 65 but lie in radial planes containing the axis of the shaft.

In FIG. 7 rods 70 are shown inclined towards opposite ends of the shaft 65 and the rods 70 are arranged so that the beater rods 70 are alternately arranged inclined towards one end of the shaft 65 and towards the other end of the shaft 65 circumferentially of the shaft 65. The rods 70 can thus be said to overlap circumferentially of the shaft.

The discs 66 and beater rods 70 constitute groups spaced apart axially of the rotor shaft 65, one group comprising two adjacent discs 66 and the rods 70 between the two discs.

Adjustment means for moving the rods 67 axially with respect to the shaft 65 are provided thereby moving the inner ends of the beater rods 70 and adjusting the inclination of the rods 70 to the discs 66 and the extent of overlap of the rods 70 in the circumferential direction.

The adjustment means for the rods 70 is located at one end of the shaft and includes a cylindrical plate 73 coaxially arranged about the shaft 65 and rotatable relative to the shaft. The plate 73 is shown laid out flat in FIG. 9 and has a series of oppositely-directed pairs of slots 74 inclined to the axis of the shaft 65 and co-operating with axially arranged slots 75 formed in the shaft 65. A pin 76 secured to the end of each rod 67 is located through the slots 74 and 75 and as the plate 73 is rotated about the shaft the pin 76 moves along the slots 74 and 75 and axially of the shaft 65.

On rotation of the plate 73 the inner ends of the rods 70 associated with one of the rods 67 move in one direction parallel to the shaft 65 and the ends of the rods 70 associated with adjacent rods 67 move in the opposite direction due to the inclination of the slots 74.

The plate 73 is held in place against the end disc 66 by a circular dip 77 and the plate 73 has a projection 78 radially projecting from one end and secured by a weld. The projection 78 carries a spring-loaded adjustment pin 79 whereby the plate 73 can be held in a selected position relative to the shaft 65. The pin 79 is located through a sleeve 80 welded to the projection 78 and a spring 81 surrounds the pin 79 between the sleeve and the disc 66. The pin 79 has a handle 82 at one end and the opposite end of the pin engages selectively in a series of holes 83 formed in the disc 66. By pulling the pin 79 out of a hole 83 against the action of the spring 81 the plate 73 can be rotated to another position and the pin inserted in another hole 83. The pin 79 is arranged to be pulled past a fixed abutment plate (not shown) into a position in which the holes 83 are disengaged so that until the pin 79 is re-engaged with holes 83 the rotor cannot be rotated.

Operation of the rotor is as follows:

The rotor rotates and generates a flow of air in the manner of an air pump, the air being constrained to flow out of the top of the rotor towards the separator. When the machine is driven forward into the crop, the beater rods strike the heads of the crop and detach the grain and some waste material. The mixture of grain and waste material is entrained in the stream of air and carried into the separator. The particular construction of beater rods illustrated has been shown to be effective in detaching grain from crops having the panicle form of head but the beaters may be modified to give better results with other types of crop.

In order to obtain grain which is relatively undamaged by the action of the beater rods and to obtain a relatively high efficiency of threshing it has been found that the selected rotational speed of the rotor and the inclination and extent of overlap of the beater rods are important. However the most advantageous characteristics of the rotor vary according to the type and the state of the crop. For example variation in the moisture content of the crop may alter the most advantageous speed of the rotor and attitude of the beater rods.

To meet differing crop conditions the speed of the rotor can be varied by changing speed of the hydraulic motor. It has been found a speed of 500–1,000 r.p.m. is advantageous and preferably the rotor speed is 700 r.p.m.

The attitude of the beater rods is adjusted by the adjustment means previously described to further vary the operating characteristics of the rotor.

The machine may be provided with a rotary cultivator behind the rotor so that the ground can be tilled and the remaining part of the crop can be turned into the ground after the grain has been removed. The rotary cultivator may be of known form having a transverse shaft and a series of axially spaced discs to which L-shaped earth-working blades are secured.

What we claim as our invention and desire to secure by Letters Patent of the United States is:

1. A harvesting machine comprising a mobile main frame, a sub-frame mounted on the main frame for movement with respect to the main frame, a parallel linkage connecting the main frame and the sub-frame, actuating means for moving the sub-frame up and down relative to the main frame, and a rotor carried on the sub-frame for gathering grain, the parallel linkage and the actuating means being arranged to move the sub-frame so that the rotor is moved forwards as it is moved upwards and rearwards as it is moved downwards.

2. A harvesting machine according to clam 1 wherein an operator's station is located on the sub-frame adjacent the rotor so that the operator is in constant relationship to the rotor as the sub-frame is moved with respect to the main frame.

3. A harvesting machine according to claim 1 wherein the sub-frame carries a separator for separating grain and waste material received from said rotor, and the sub-frame maintains a constant attitude to the ground surface during up and down movement relative to the main frame.

4. A harvesting machine according to claim 1 wherein the parallel linkage includes links each connected at one end to the main frame and at the other end to the sub-frame, the connections to the main frame being in advance of the connections to the sub-frame with respect to the direction of travel.

5. A harvesting machine according to claim 1 wherein the actuating means includes a hydraulic ram connected between the base frame and the sub-frame.

6. A harvesting machine according to claim 1 wherein the main frame is mounted on endless driven tracks for movement over the ground.

7. A harvesting machine according to claim 1 wherein the rotor includes beater members for acting on the grain-carrying heads of the crop to remove grain-therefrom, the rotor being positioned by the actuating means for harvesting purposes at or below the level of the lowermost heads of the crop to be harvested.

8. A harvesting machine according to claim 1 comprising a conveyor for conveying grain to collecting means located on the main frame, the conveyor being connected at one end to the sub-frame and being pivotable about the other end when the sub-frame is moved relative to the main frame.

* * * * *